(12) United States Patent
Niiyama (10) Patent No.: US 6,693,624 B1
(45) Date of Patent: Feb. 17, 2004

(54) JOYSTICK OPERATED POSITIONING DEVICE FOR A COMPUTER

(75) Inventor: Takashi Niiyama, Gunma (JP)

(73) Assignee: Hosiden Corporation, Osaka (JP)

( * ) Notice: Subject to any disclaimer, the term of this patent is extended or adjusted under 35 U.S.C. 154(b) by 225 days.

(21) Appl. No.: 09/599,518

(22) Filed: Jun. 23, 2000

(30) Foreign Application Priority Data

Jul. 2, 1999 (JP) .......................................... 11-189162

(51) Int. Cl.[7] ................................................. G09G 5/08
(52) U.S. Cl. ......................... 345/161; 345/157; 341/34
(58) Field of Search ................................. 345/156, 157, 345/159, 160, 161, 164, 184, 168; 341/34; 200/5 A, 5 R, 6 A (56) References Cited

U.S. PATENT DOCUMENTS

| | | | |
|---|---|---|---|
| 5,640,178 A | | 6/1997 | Endo et al. |
| 5,714,980 A | * | 2/1998 | Niino .......................... 345/160 |
| 5,815,139 A | * | 9/1998 | Yoshikawa et al. ......... 345/157 |
| 5,889,507 A | * | 3/1999 | Engle et al. ................ 345/161 |
| 6,040,823 A | * | 3/2000 | Seffernick et al. .......... 345/168 |
| 6,293,160 B1 | * | 9/2001 | Shigemoto ............. 73/862.632 |

FOREIGN PATENT DOCUMENTS

| | | |
|---|---|---|
| EP | 0 869 343 A1 | 3/1998 |
| EP | 0 905 600 A1 | 9/1998 |

* cited by examiner

Primary Examiner—Amr Awad
(74) Attorney, Agent, or Firm—Connolly Bove Lodge & Hutz LLP (57) ABSTRACT

A pattern sheet 1 made of a flexible synthetic resin film forms, as a single-piece structure, a strain sensor support portion 11 having on the back thereof four resistance films 14 arranged equidistantly about a hole 17 and a wire lead-out portion 12 having formed thereon wires for the resistance films 14 and leads 15; an actuation panel 2 made of a square thin sheet of resilient metal has an actuation-deformable portion 21 with its four corner portions downturned to form step-shaped fixing pieces 22; a joystick 3 is press-fitted in a centrally-disposed hole 23 of the actuation panel 2; the strain sensor support portion 11 is adhesive bonded to the actuation-deformable portion 21 with edges 17 of the support portion 11 held in line contact with the fixing pieces 22; and the fixing pieces 22 are adhesive bonded or welded to a mounting plate 4.

14 Claims, 12 Drawing Sheets

JOYSTICK OPERATED POSITIONING DEVICE FOR A COMPUTER

BACKGROUND OF INVENTION

The present invention relates to a multi-way input device which is used, for example, to move the cursor on the display screen of a computer to input thereto two-dimensional coordinates and, more particularly, to a multi-way input device using a strain-sensitive material.

Figure 1:
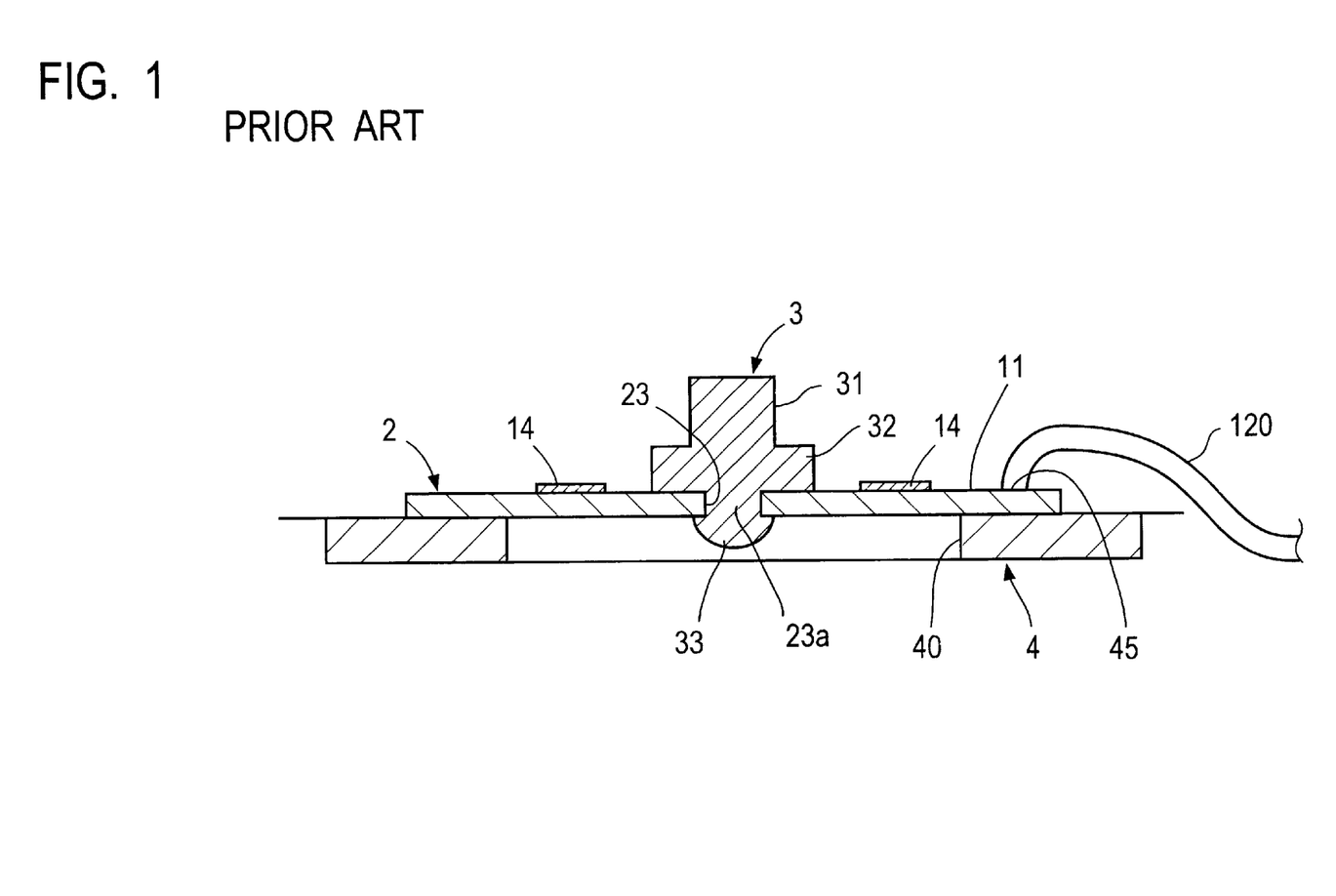
FIG. 1 is a sectional view depicting a conventional multi-way input device.

FIG. 1 is a diagrammatic showing of a conventional device of this kind. Mounted on a mechanically strong, thin, flat, resilient metal plate 2 as of stainless steel is a joystick-like member (hereinafter referred to simply as a joystick) 3 with its downward protrusion 23a press-fitted in a centrally-disposed hole 23 of the thin metal plate 2 and swaged thereto. On the top surface of the resilient metal plate 2 there are formed four resistance films 14 at equiangular intervals about the hole 23. Underlying the resilient metal plate 2 is a mechanically strong, thick and flat mounting plate 4 as of stainless steel which has an opening 40. The resilient metal plate 2 has its marginal portion bonded or welded to the thick metal plate 4 in a manner to cover the opening 40. The joystick 3 is held coaxial with the opening 40. The resistance films 14 are connected to an external circuit via a flexible cable 120 fixedly attached to the top surface of the resilient metal plate 2.

The resistance films 14 are, for example, carbon-film resistors formed by screen printing. When the joystick 3 is tilted, two resistance films 14 in the direction of tilting and in the direction opposite thereto are deformed by a compressive force and a tensile force, respectively, and hence their resistance values change accordingly, indicating the direction of tilting of the joystick 3 and the extent how much it is being tilted.

With this conventional multi-way input device, since the mounting plate 4 and the resilient metal plate 2 are both flat or planar parts as mentioned above, bonding or welding of such flat plates is likely to cause a misalignment between their center axes. Some of multi-way input devices of this kind are very small, for example, measuring approximately 8 mm by 8 mm. Hence, even a slight misalignment between the mounting plate 4 and the resilient metal plate 2 affects the operation characteristics of such miniaturized multi-way input devices.

Since the multi-way input device is usually mounted, for example, in a keyboard switch with its mounting plate 4 attached to a flat or planar surface portion of a different object, it is inevitably necessary that the flexible cable 120 be connected to the joystick 3 side and that electric circuits including the resistance films 14 be formed over the exposed surface of the resilient metal plate 2. Accordingly, the electric circuits are always exposed to the outside, and hence they are susceptible to external noise.

At a joint 45 where the flexible cable 120 is fixedly secured to the surface of the resilient metal plate 2, scaling of or some other damages to printed wires is likely to occur.

Furthermore, the conventional multi-way input device involves a relatively many manufacturing steps of forming the resistance films 14 on the surface of the resilient metal plate 2, carrying out wiring for connecting the resistance films 14 to the flexible cable 120 and fixedly connecting the flexible cable 120 to the wiring.

SUMMARY OF THE INVENTION

It is therefore an object of the present invention to provide a multi-way input device which allows ease in the implementation of stable operation characteristic.

Another object of the present invention is to provide a multi-way input device which is insusceptible to damage.

Another object of the present invention is to provide a multi-way input device which is insusceptible to external noise.

Still another object of the present invention is to provide a multi-way input device which is easy to manufacture.

According to the present invention, there is provided a multi-way input device which comprises a pattern sheet, an actuation panel, a joystick, and a mounting plate and in which the pattern sheet has, as a one-piece structure of a flexible synthetic resin film, a strain sensor support portion and a wire lead-out portion. The strain sensor support portion has a plurality of strain sensors formed on its one side, and the wire lead-out portion has formed on one side thereof leads connected at one end to the strain sensors in a plane common therewith. The actuation panel is made of a thin sheet of resilient metal, which has an actuation-deformable portion and a plurality of fixing portions bent therefrom in the same direction. The strain sensor support portion is adhesive bonded on the side thereof opposite the strain sensors to the inside surface of the actuation-deformable portion on the side where the fixing portions protrude. The joystick is mounted protrusively on the actuation-deformable portion of the actuation panel at a position equidistant from the plurality of strain sensors. The actuation panel is fixed to the mounting plate through the plurality of fixing portions with the actuation-deformable part spaced away from the strain sensor support portion. The plurality of fixing portions may preferably be flat pieces. The strain sensor support portion has positioning edges for line contact with the flat surfaces of the fixing pieces of the actuation panel. The strain sensor support portion is positioned relative to the actuation-deformable portion with the positioning edges and the corresponding fixing pieces held in line contact with each other.

It is preferred that the actuation panel be formed by press working of a thin sheet of resilient and that the pattern sheet be formed by press cutting from a flexible synthetic resin film.

DETAILED DESCRIPTION OF THE PREFERRED EMBODIMENTS

Figure 2:
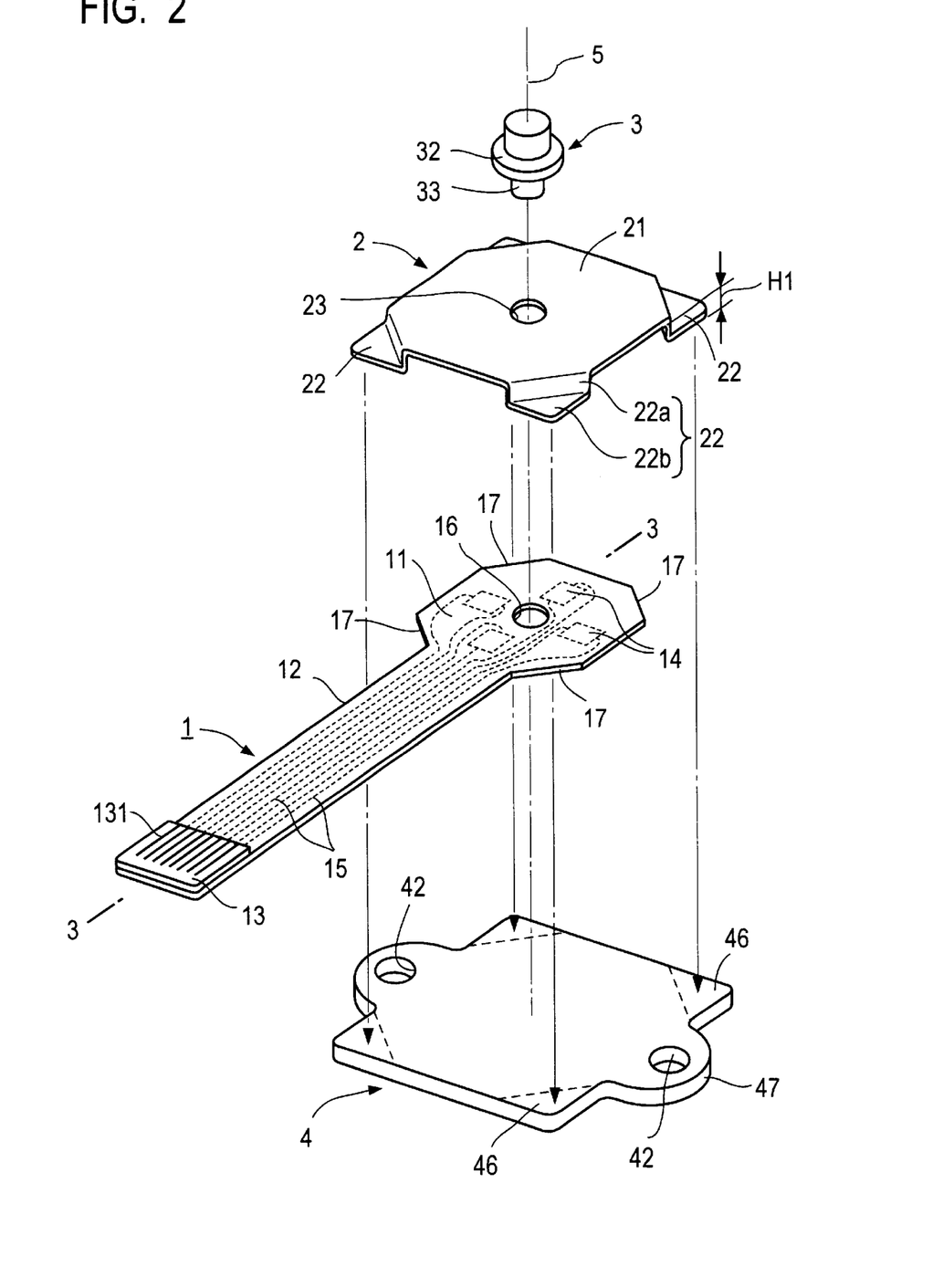
FIG. 2 is an exploded perspective view illustrating a first embodiment of the present invention.
Figure 3:
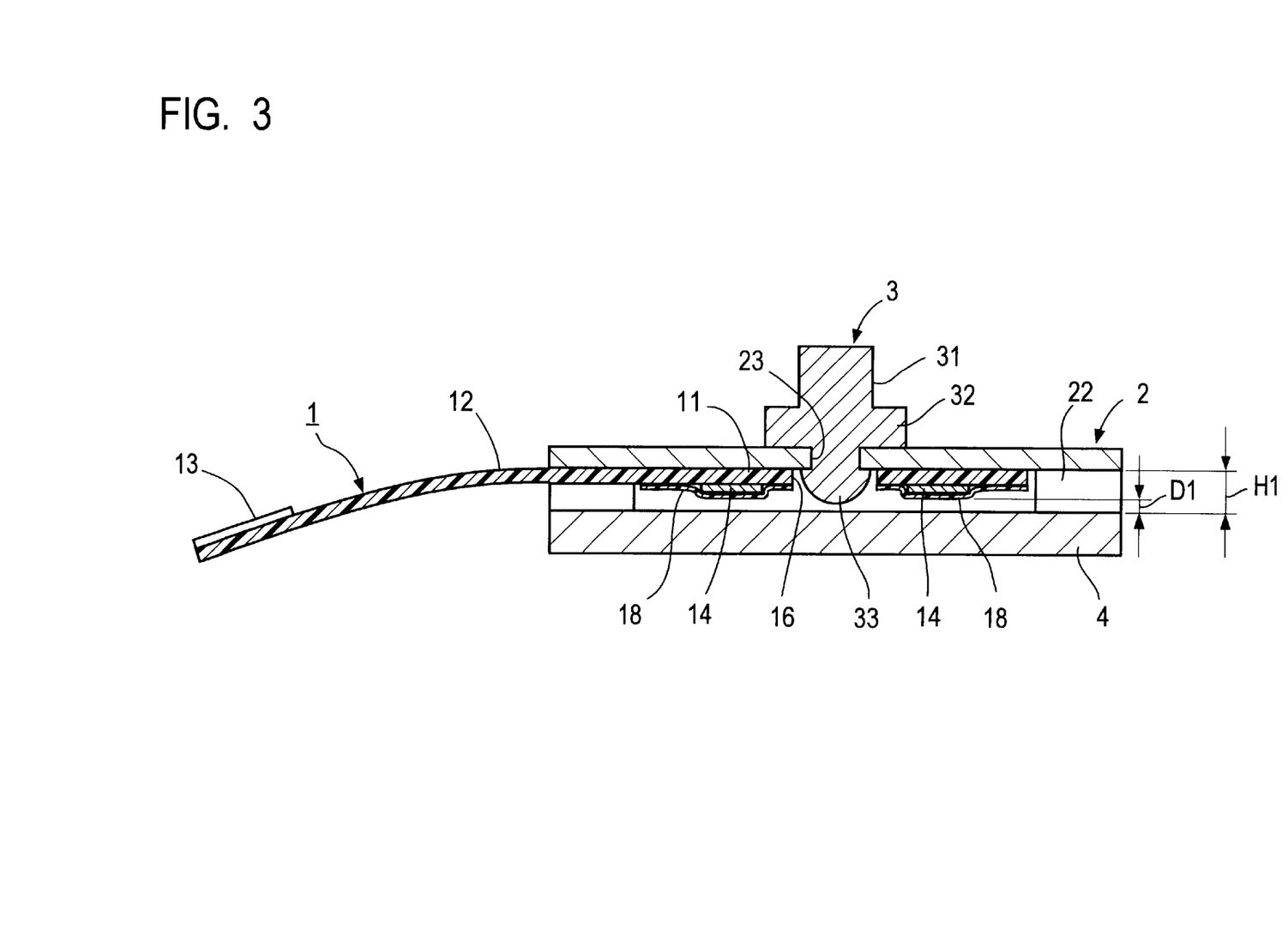
FIG. 3 is a sectional view taken on the line 3—3 passing across an axis 5 in FIG. 2.

Referring first to FIGS. 2 and 3, a multi-way input device according to a first embodiment of the present invention will be described below. FIG. 2 is an exploded perspective view of the multi-way input device, and FIG. 3 is a sectional view of the FIG. 2 embodiment in assembled form taken along the line 3—3 passing across an axis 5 in FIG. 2. A pattern sheet 1 is a relatively hard but elastic and flexible synthetic resin film as of polyethylene terephthalate, polyimide or polycarbonate. The pattern sheet 1 is composed of a strain sensor support portion 11 and a long, narrow wire lead-out portion 12 formed integrally therewith and extending therefrom. The strain sensor support portion 11 in this embodiment is an octagonal member formed by cutting off four corners of a substantially square. The wire lead-out portion 12 extends from one side of the octagon to a terminal portion 13. The strain sensor support portion 11 has a centrally-disposed hole 16. On one side of the strain sensor support portion 11, in the illustrated example, on the underside thereof, there are formed four strain sensors 14 at positions equiangularly spaced with respect to and equidistant from the centrally-disposed hole 13. The strain sensors 14 may be resistance films, which can be formed as by screen printing with carbon paste. The strain sensors 14 each have a pair of flat leads connected to terminals 131 of the terminal portion 13 via the wire lead-out portion 12. These flat leads or conductor traces 15 are formed, for example, by wire printing techniques and the wire lead-off portion 12 has the same structure as does an ordinary flexible flat cable. A total of eight leads 15 led into an external device such as a keyboard or personal computer via the terminals 131 of the terminal portion 13 are usually connected to form a bridge circuit using the four strain sensors as four arms. To keep the strain sensors 14 from contact with other metal and to prevent their deterioration, it is desirable that the strain sensors 14 and, if necessary, their leads be covered with protective films 18 which are formed by printing with resist ink.

An actuation panel 2 is made of a thin sheet of mechanically strong, resilient metal such as stainless steel, and has an actuation-deformable portion 21 and a plurality of fixing portions 22 bent therefrom in the same direction. In this embodiment the actuation panel 2 is has an octagonal actuation-deformable portion 21 formed by bending down four corner portions of a substantially square metal sheet to form four fixing portions 22 as flat pieces. The fixing pieces 22 are each composed of a spacing part 22a extending from the actuation-deformable portion 21 substantially perpendicularly thereto and a triangular fixing part 22b extending outwardly from the spacing part 22a substantially at right angles thereto, that is, extending in parallel to the actuation-deformable portion 21. The spacing parts 22a of the respective fixing pieces 22 have the same height H1.

The strain sensors support portion 11 is positioned on and fixed to the actuation-deformable portion 21. In this embodiment the actuation-deformable portion 21 and the strain sensor support portion 11 have about the same geometries. The strain sensor support portion 11 has positioning edges 17 corresponding to the fixing pieces 22. The strain sensor support portion 11 is positioned to the actuation-deformable portion 21 with each positioning edge held in line contact with the inside of the corresponding fixing piece 22, in this example, the inside of the corresponding spacing part 22a.

The strain sensor support portion 11 is adhesive bonded over the entire area of its surface to the actuation-deformable portion 21. The center hole 16 of the strain sensor support portion 11 and a joystick fixing hole 23 of the actuation-deformable portion 21 are axially aligned, and the strain sensors 14 are equidistant from the joystick fixing hole 23.

The joystick fixing hole 23 is disposed centrally of the actuation-deformable portion 21. The fixing pieces 22 are spaced the same distance away from the hole 23. The height H1 of the spacing part 22b of each fixing piece 22 is selected such that the actuation of the joystick 3 will not cause the strain sensors 24 to contact a mounting plate 4 described later on after the actuation panel 2 is mounted thereto through the fixing pieces 22. Incidentally, the strain sensor support portion 11 is bonded, on the side opposite the strain sensors 14, to the underside of the actuation-deformable portion 21 in full surface-to-surface contact therewith with the side laden with the strain sensors 14 facing downward. The joystick 3 is made of metal, for example, and is secured to the actuation-deformable portion 21 by press-fitting its downward projection 33 into the hole 23 of the latter until a flange 32 and the downward protrusion 33 of the former firmly hold therebetween the marginal portion of the hole 23 so that the protrusion 33 is swaged to the actuation-deformable portion 21.

At this time, if the strain sensor support portion 11 is also firmly gripped, distortion occurs therein, and detected resistance values of the strain sensors 14 change accordingly. To avoid this, the hole 16 is made larger than the hole 23. The mounting plate 4 is made of a mechanically strong thick sheet of metal, ceramics or synthetic resin, and in this embodiment it has a square form of about the same size as that of the actuation panel 2. As indicated by the broken lines, the mounting plate 4 has triangular seats 46, at four corners on its one side, for reception of the fixing parts 22b of the fixing pieces 22 of the actuation panel 2. The fixing parts 22b are welded or bonded to the triangular seats 46. Jutting out from opposite ends of the mounting plate 4 are mounting portions 47 which have holes 42 for fixing to other object. The wire lead-out portion 12 extends to the outside from between adjacent the fixing pieces 22.

A brief description will be given of a method for the manufacture of the multi-way input device of the above embodiment. The manufacture begins with preparing, for example, a 0.1-mm thick flexible but relatively hard and elastic synthetic resin film as of polyethylene terephthalate coated over the entire area of its one side with copper foil. The copper foil is patterned by what is called wire printing technique to form the leads 15 and conductor traces for the strain sensors, followed by screen printing of a carbon-silver paste to form resistance films as the strain sensors 14 connected to the above-mentioned conductor traces. The resistance value of each resistance film 14 is selected to be, for example, approximately 30 kΩ. If necessary, resist ink is printed over the entire area of one side of the synthetic resin film, including the resistance films 14, their conductor traces and the leads 15 to form a protective film 18. A plurality of such patterns are formed on one synthetic resin film and are severed by press-cutting into individual pattern sheets with leads 15 and resistance films 14 disposed as predetermined as depicted in FIG. 2. At this time, the center hole 16 is also made. In this way, the pattern sheet 1 is prepared.

And, for example, a 0.2-mm sheet of stainless steel is stamped into square shape, while at the same time cutting and bending work are also done to prepare the actuation panel 2 depicted in FIG. 2. At this time, the hole 23 is also made. In this embodiment the actuation panel 2 is supposed to be as small as 9 by 9 mm or so.

The protrusion 33 of the joystick 3 is press-fitted into the hole 23 of the actuation-deformable portion 21 of the actuation panel 2 from above so that the protrusion 33 is swaged to the surface of the actuation-deformable portion 21 to thereby fixedly secure the joystick 3 to the actuation panel 2. Next, the upper side of the strain sensor support portion 11 where the resistance films 14 are not formed is adhesive bonded to the underside (inside surface) of the actuation-deformable portion 21 of the actuation panel 2 to provide a single-piece structure of the strain sensor support portion 11 and the actuation panel 2. In this instance, since the strain sensor support portion 11 is flexible but relative hard and elastic, it can easily be positioned relative to the actuation-deformable portion 21 by guiding the positioning edges 17 on the inside surfaces of the fixing pieces 22, and the holes 23 and 16 can also be brought into alignment with each other. Excess or insufficient amounts of adhesive can affect the strain sensing operation. It is preferable that the strain sensor support portion 11 be in intimate surface-to-surface contact with the actuation-deformable portion 21. To meet this requirement, it is desirable to use adhesive which spreads well and enters into both contact surfaces by capillary action, such as instant glue as of the cyanoacrylate series. To determine an appropriate amount of adhesive used, it is experimentally ascertained in advance how many drops of adhesive be supplied from a dispenser onto the inside surface of the actuation-deformable portion 21 of the actuation panel 2 to provide an excellent bond between it and the strain sensor support portion 11. In this embodiment, the appropriate amount of adhesive is four drops; the strain sensor support portion 11 is pressed against the actuation-deformable portion 21 into intimate contact therewith after supplying four drops of adhesive. To provide increased tack power of the adhesive, it is preferable to activate the both contact surfaces of the strain sensor support portion 11 and the actuation-deformable portion 21 by cleaning them with a surface treatment agent such as heptane prior to their bonding.

Finally, the fixing parts 22b of the fixing pieces 22 at the four corners of the actuation-deformable portion 21 with the strain sensor support portion 11 cemented thereto are placed at the corresponding four corner portions 46 of the mounting plate 4, and the fixing parts 22b and the corner portions 46 are adhesive bonded or resistance- or laser-welded to each other. In this instance, the height H1 of the spacing portion 22a of each fixing piece 22 provides an about 0.5-mm spacing between the protective film 18 and the mounting plate 4 as shown in FIG. 3. In this way, the multi-way input device is assembled.

With this multi-way input device, when the joystick 3 is tilted in a certain direction, that one of the resistance films 14 on the strain sensor support portion 11 which lies in the direction in which the joystick 3 is being tilted is deformed by a compressive or tensile force, and the resistance value of that resistance film 14 changes accordingly, indicating the direction in which the joystick 3 is being tilted.

Figure 4:
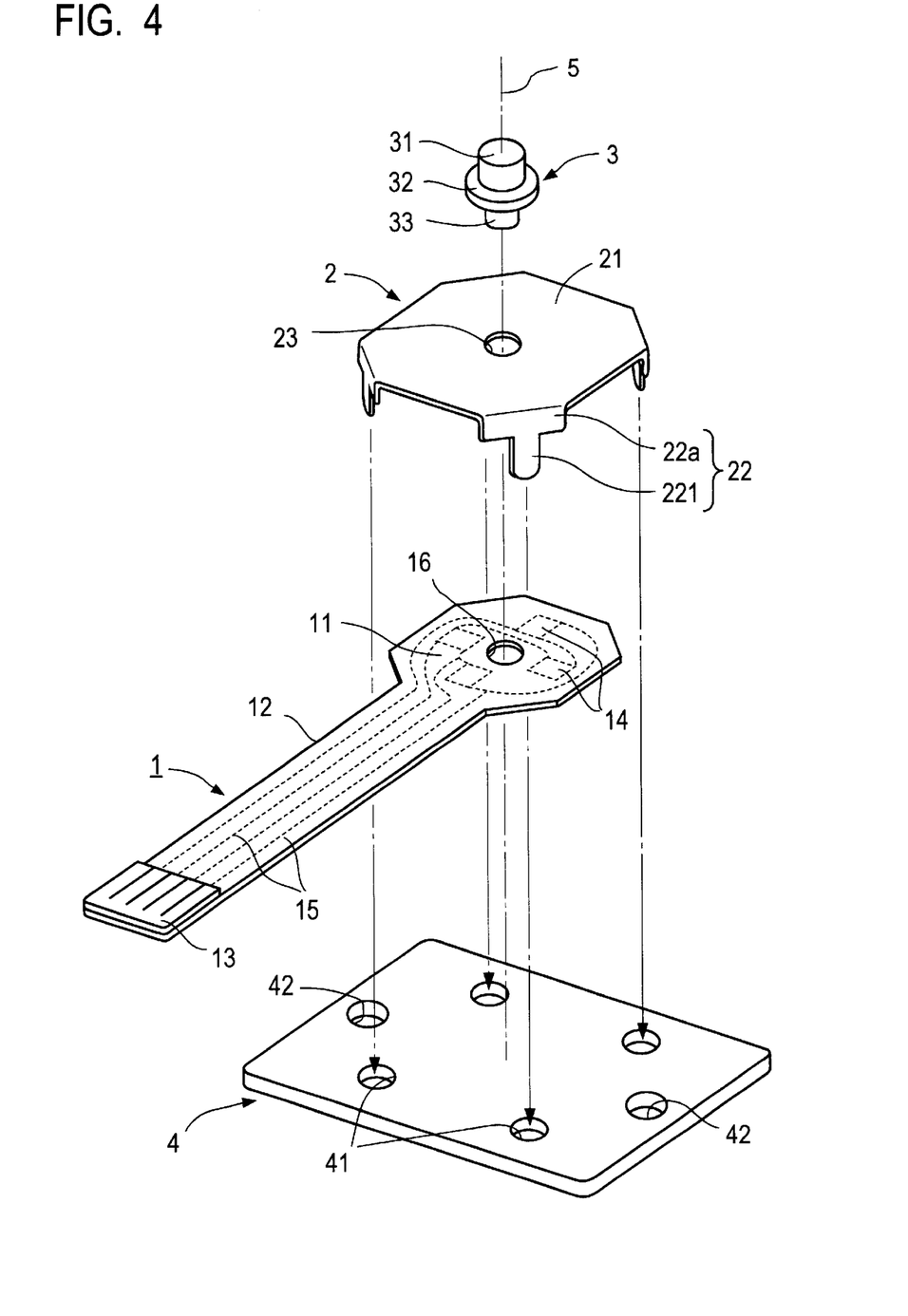
FIG. 4 is an exploded perspective view illustrating a second embodiment of the present invention.
Figure 5:
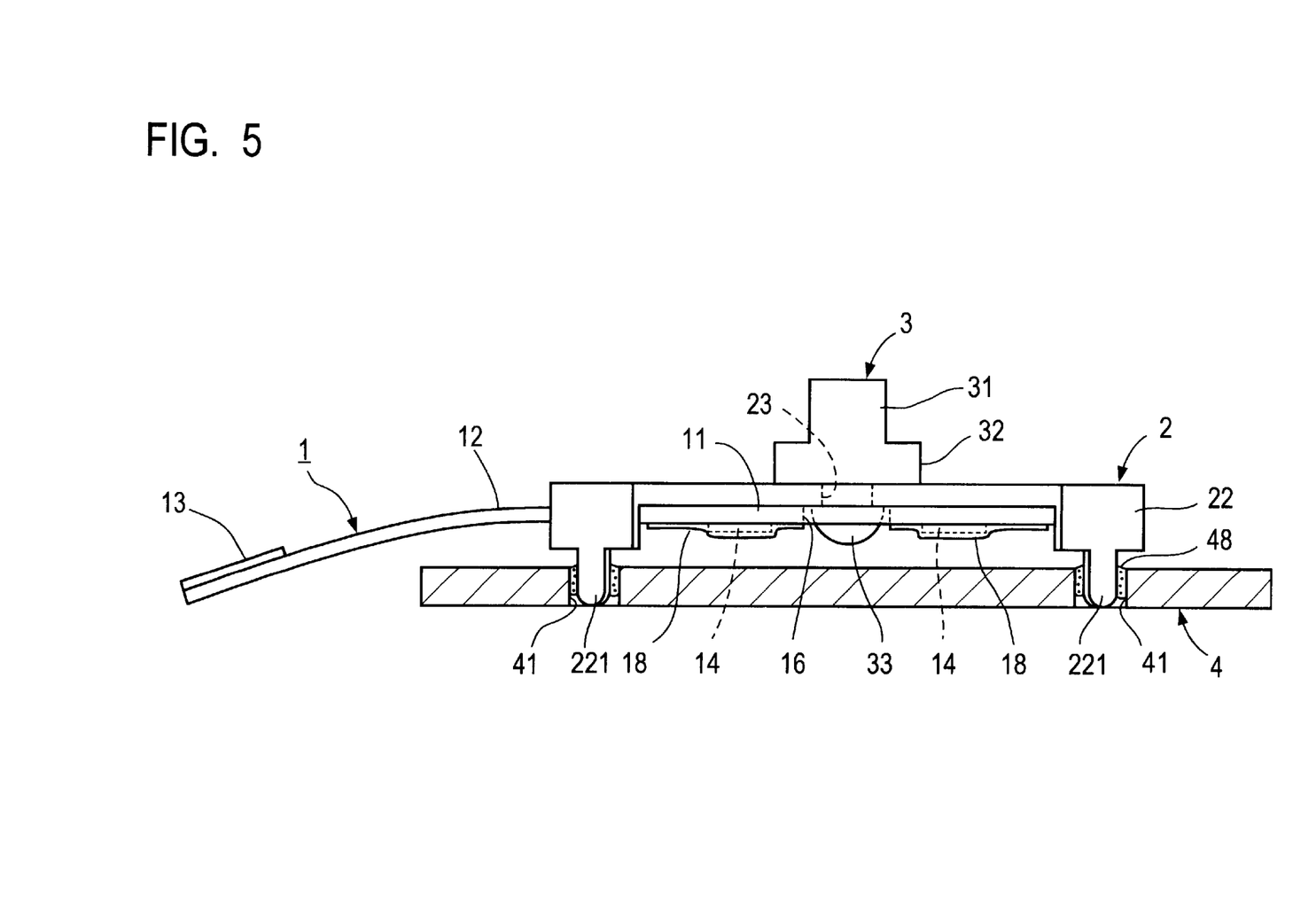
FIG. 5 is a partly sectioned front view of the FIG. 2 embodiment.

FIGS. 4 and 5 illustrate a second embodiment of the present invention, in which the parts corresponding to those in FIGS. 2 and 3 are identified by the same reference numerals.

In this embodiment the fixing pieces 22 each have a narrow tab 221 extending down from the lower edge of the spacing portion 22a centrally thereof.

The mounting plate 4 has holes 41 for reception of the tabs 221 of the four fixing pieces 22. The tabs 221 is positioned in the holes 41 of the mounting plate 4 and then they are press-fitted into the holes 41 by pressing the actuation panel 2 from above. If necessary, adhesive may be poured into the holes 41 as indicated by 48 to ensure fixing of the tabs 221 to the mounting plate 4.

In this embodiment, the four strain sensors formed as resistance films 14 are wired on the sensor support portion 11 to form a bridge circuit using each sensor as one arm, and the number of leads 15 is four.

Figure 6:
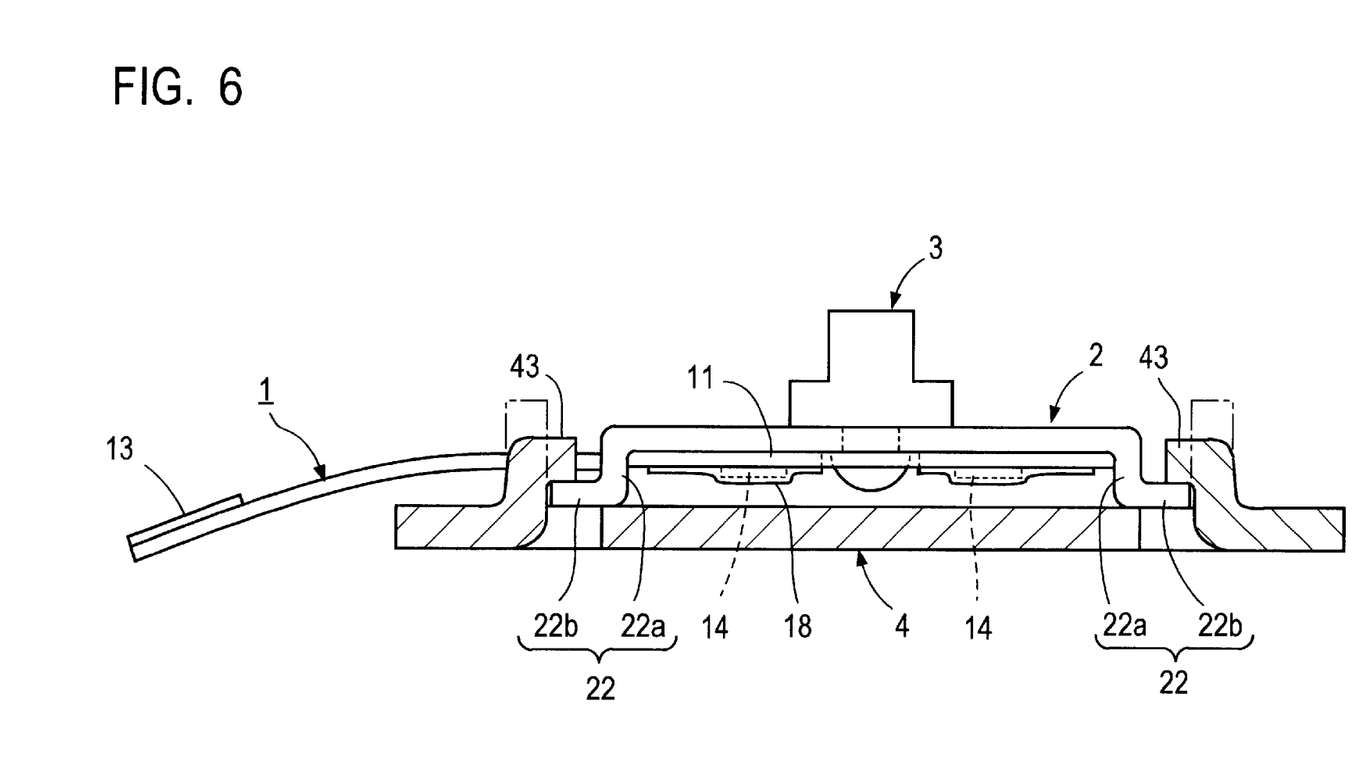
FIG. 6 is a partly sectioned front view of a third embodiment of the present invention.

FIG. 6 illustrates a third embodiment of the present invention, in which the parts corresponding to those in FIG. 3 are identified by the same reference numerals. In this embodiment the mounting plate 4 is a metal sheet and has pawls 43 at positions corresponding to the fixing pieces 22 of the actuation panel 2. The pawls 43 are upturned by stamping from the mounting plate 4 as indicated by the broken lines. The tip of the fixing part 22b of each fixing piece 22 is held virtually in contact with the inside of one of the pawls 43, and each pawl 43 is bent onto the fixing part 22b as indicated by the solid lines, by which the actuation panel 2 is fixedly secured to the mounting plate 4.

Figure 7:
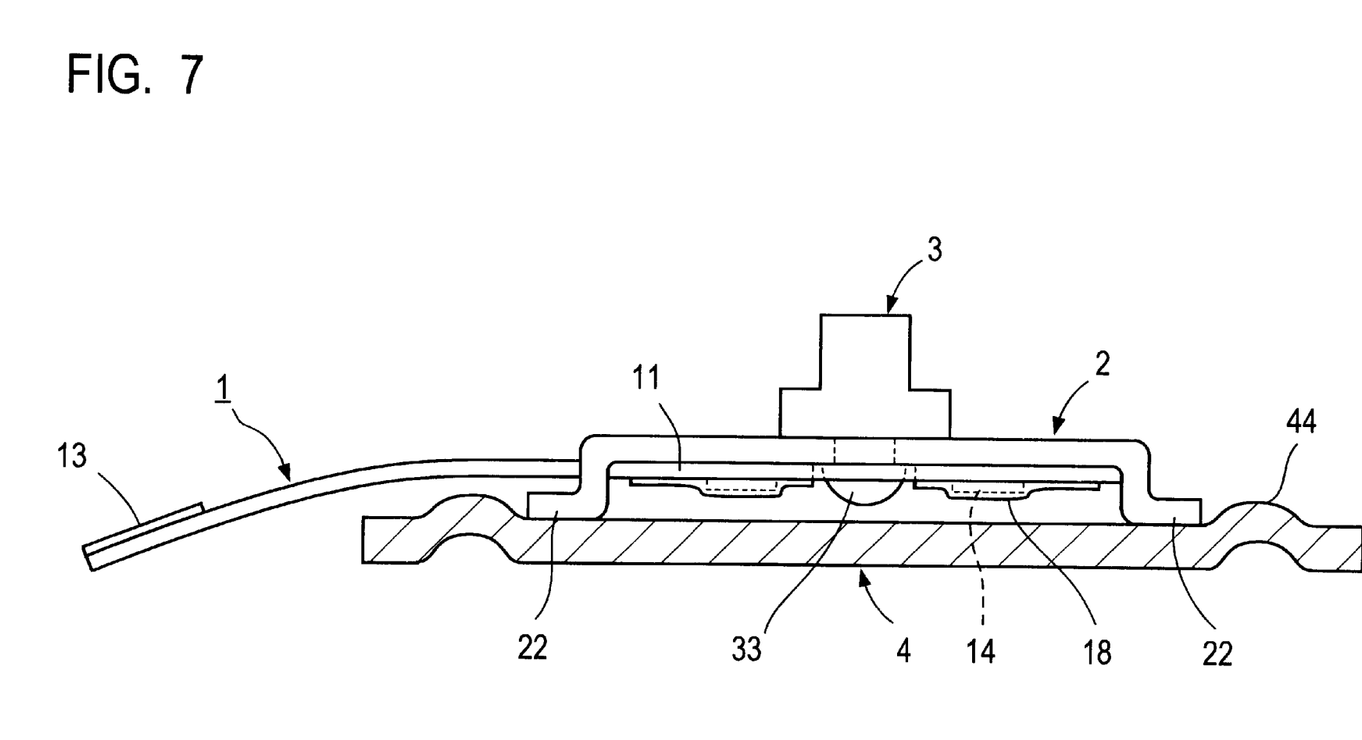
FIG. 7 is a partly sectioned front view of a fourth embodiment of the present invention.

FIG. 7 illustrates a fourth embodiment of the present invention, in which the parts corresponding to those in FIG. 3 are identified by the same reference numerals. The mounting plate 4 is made of a metal sheet, and has on its upper side upwardly projecting positioning bumps 44 corresponding to the four fixing pieces 22 of the actuation panel 2. The fixing parts 22b of the fixing pieces 22 are welded or bonded to the mounting plate 4 with their tips held in contact with or adjacent the positioning bumps 44.

Figure 8:
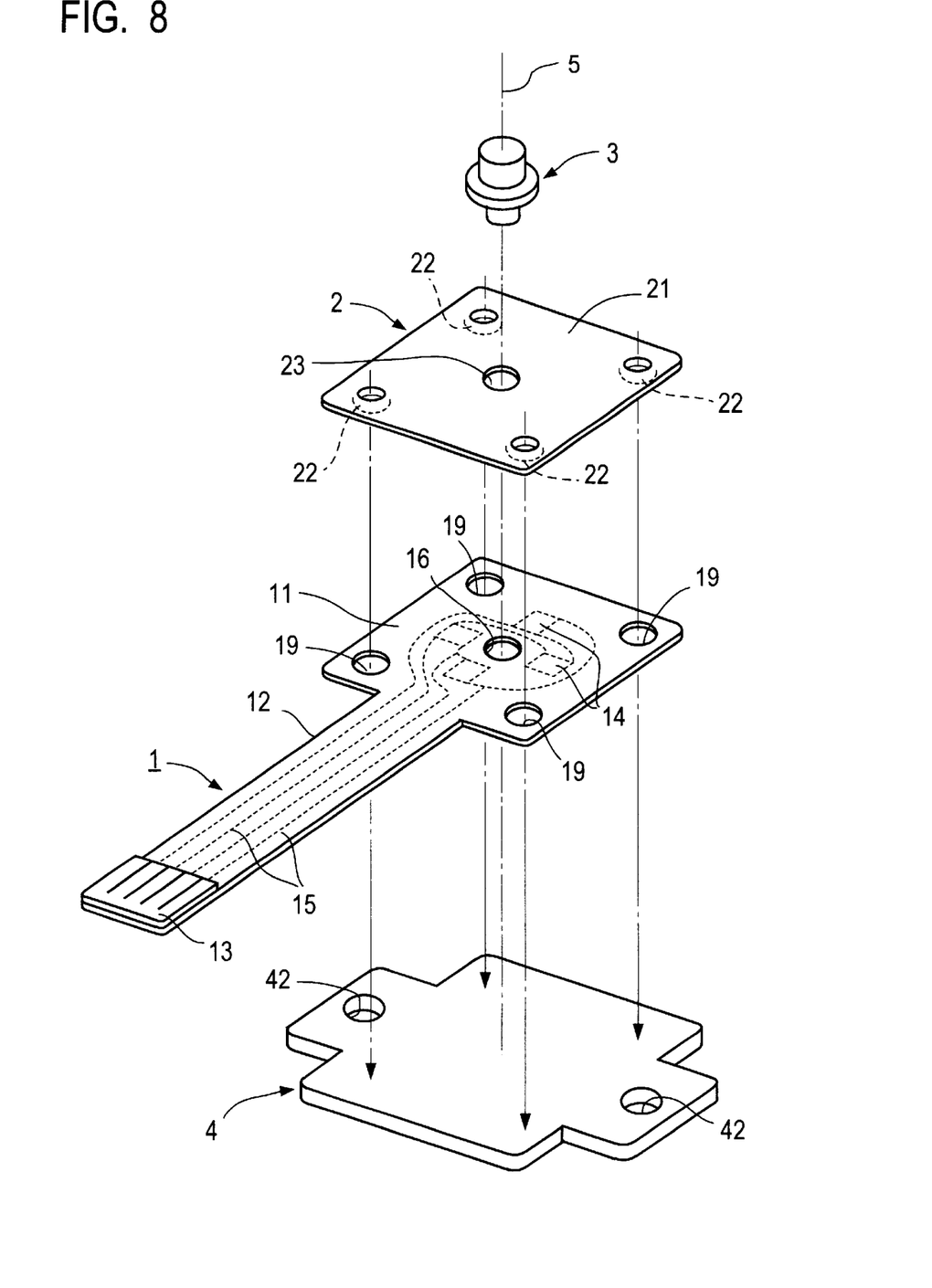
FIG. 8 is an exploded perspective view of a fifth embodiment of the present invention.
Figure 9:
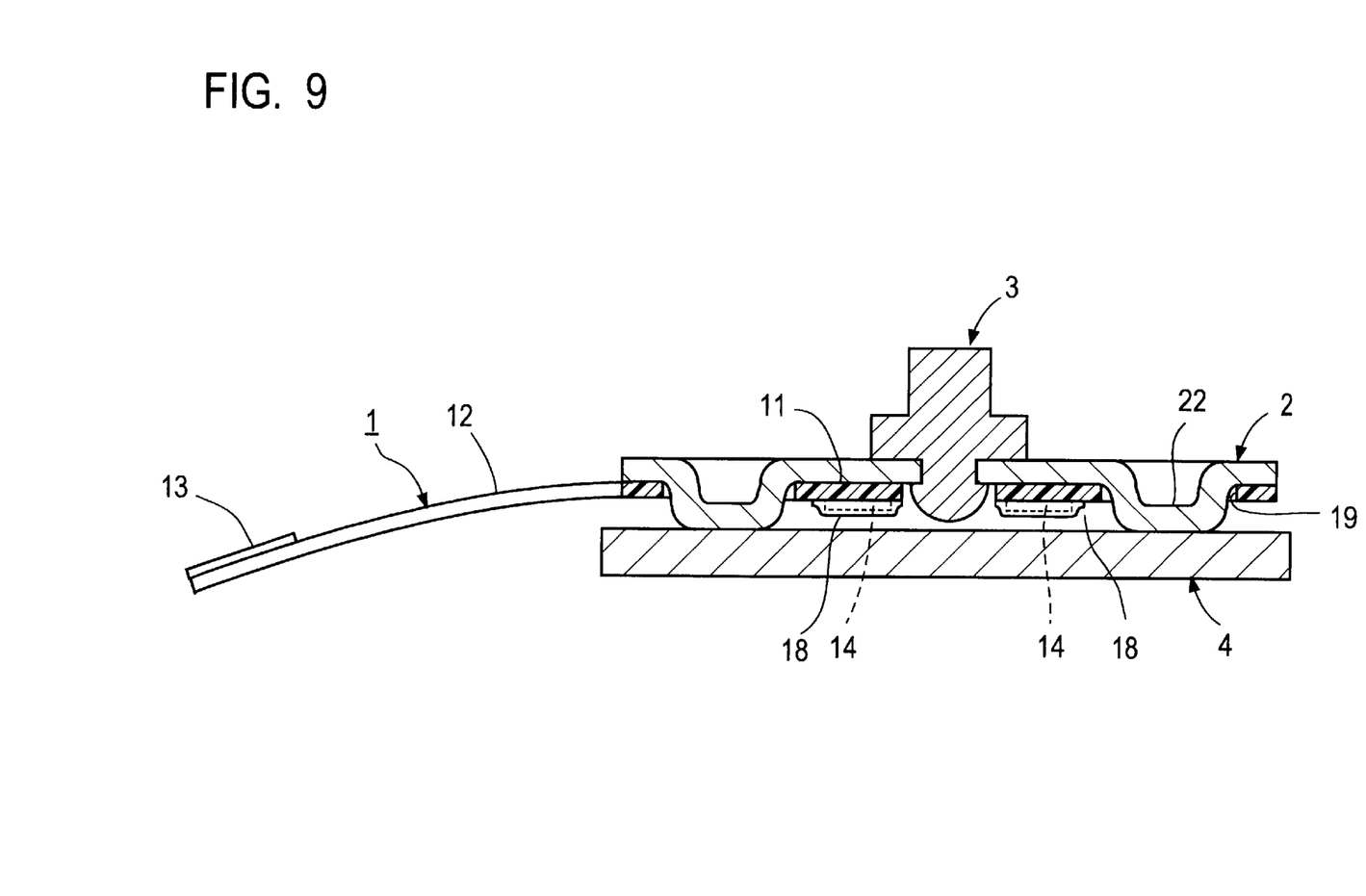
FIG. 9 is a partly sectioned front view of the fifth embodiment.

FIGS. 8 and 9 illustrate a fifth embodiment of the present invention, in which the parts corresponding to those in FIGS. 2 and 3 are identified by the same reference numerals. In this embodiment the fixing portions 22 form cylindrical tabs which are punched downwardly from the actuation panel 2 during press working of the latter. The fixing portions 22 may be square-sectioned as well. The cylindrical tabs 22 have the same height H1 as in the embodiments described previously and their positions with respect to the joystick receiving hole 23 are also the same as in the above embodiments.

At the positions corresponding to the cylindrical tabs 22 the strain sensor support portion 11 has made therein positioning holes 19 which conform to the outer peripheral surfaces of the cylindrical tabs 22 and hence snugly receive them. In the illustrated embodiment, the positioning holes 19 are shown to be circular in cross section, into which the cylindrical tabs 22 are guided to position the actuation panel 2 and the strain sensor support portion 11 relative to each other. The actuation panel 2 and the strain sensor support portion 11 are adhesive bonded as described previously. The positioning holes 19 are made simultaneously with press-cutting of the pattern sheet 1.

The lower end faces of the cylindrical tabs 22 are welded or adhesive bonded to the mounting plate 4.

Figure 10:
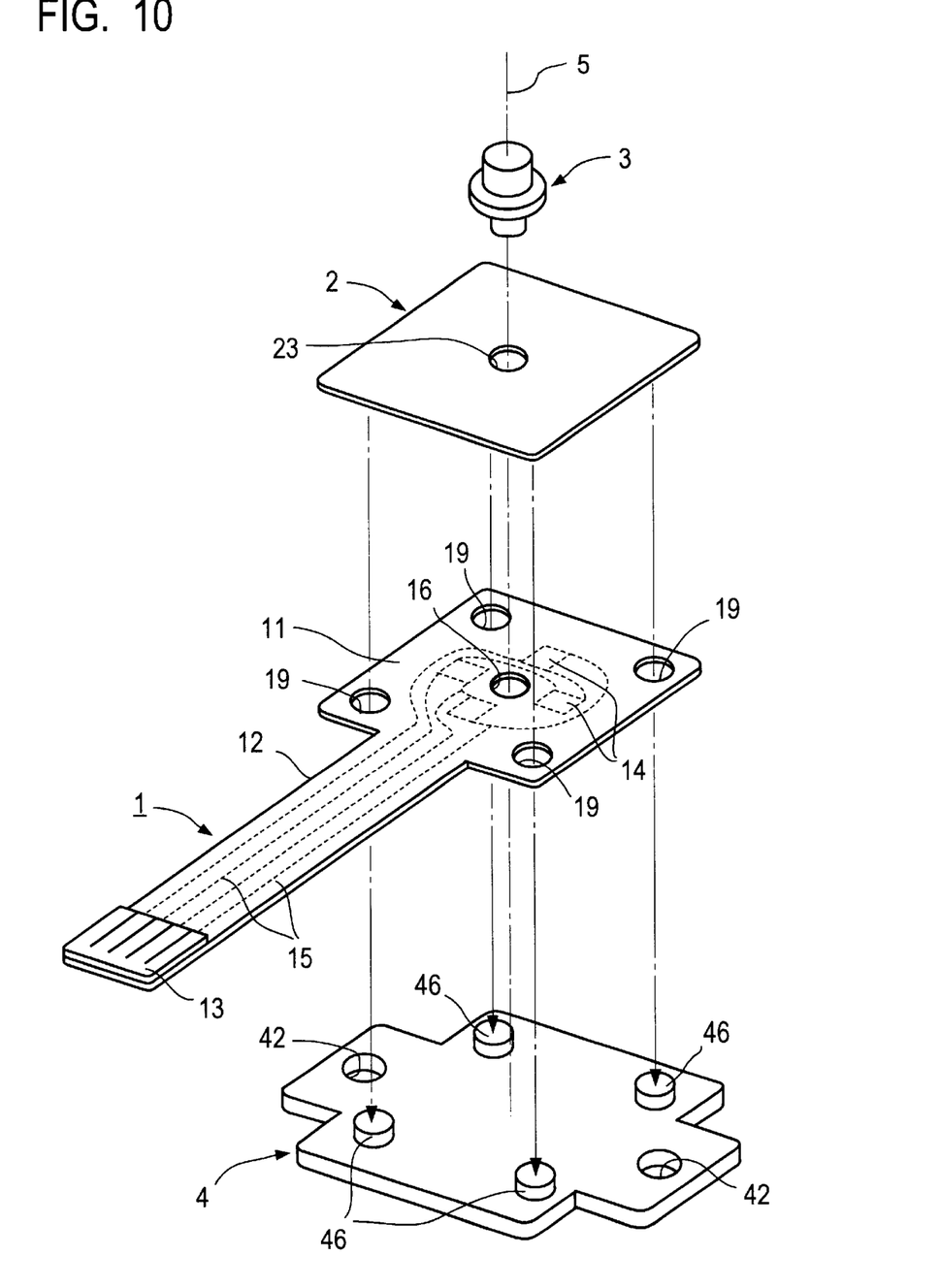
FIG. 10 is an exploded perspective view of a sixth embodiment of the present invention.
Figure 11:
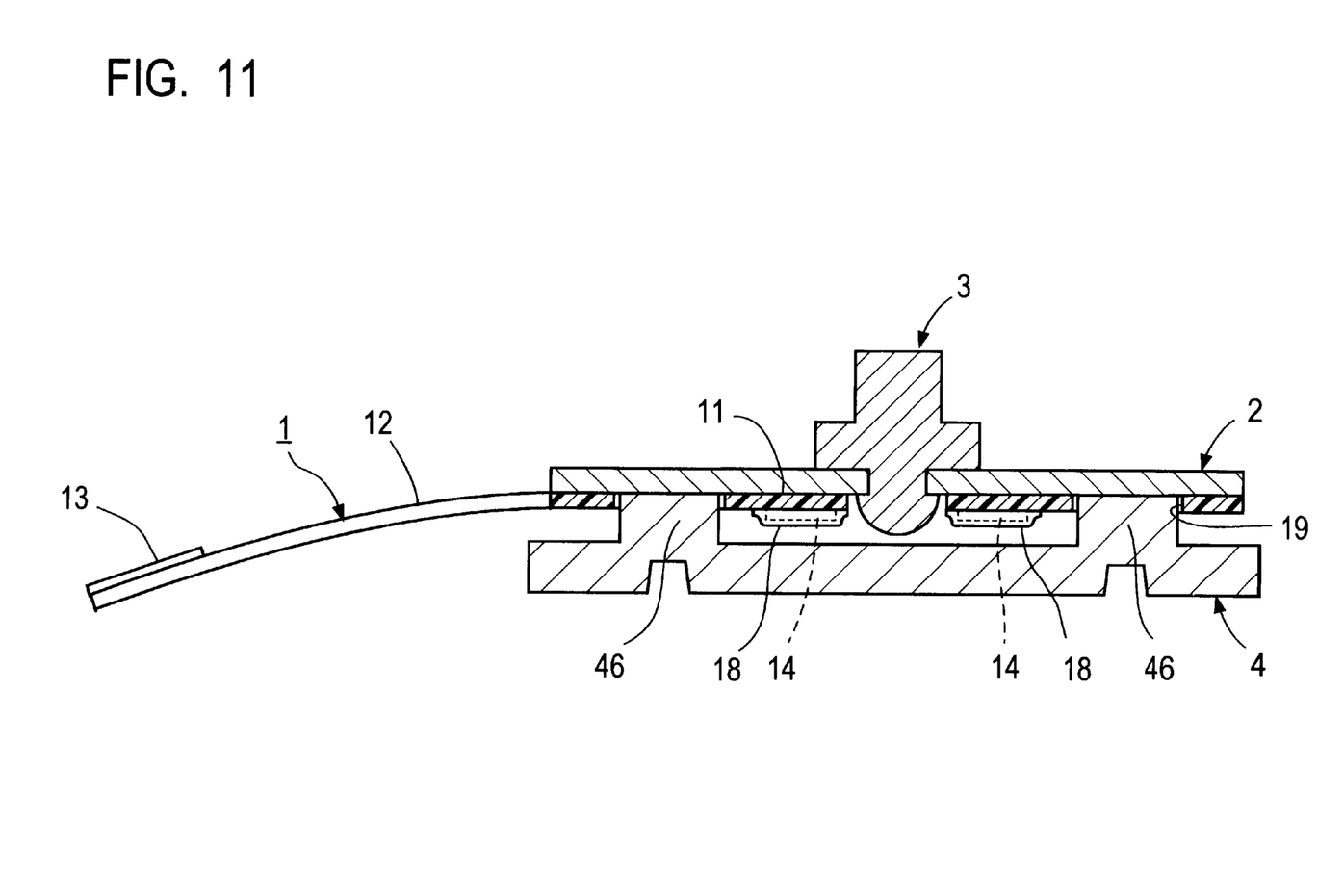
FIG. 11 is a partly sectioned front view of the fifth embodiment.

FIGS. 10 and 11 illustrate a sixth embodiment of the present invention, in which the parts corresponding to those in FIGS. 2, 3 and 8 are identified by the same reference numerals. In this embodiment the actuation panel 2 is planar and has no fixing portions 22. The actuation panel 2 and the strain sensor support portion 11 are identical in shape and in size; they are shown to be virtually square. The strain sensor support portion 11 has made therethrough a plurality of positioning holes 19, which are disposed at the positions corresponding to the fixing portions 22 in the above embodiment. In FIG. 10 the positioning holes 19 are shown to be made at four corners of the square strain sensor support portion 11.

Figure 12:
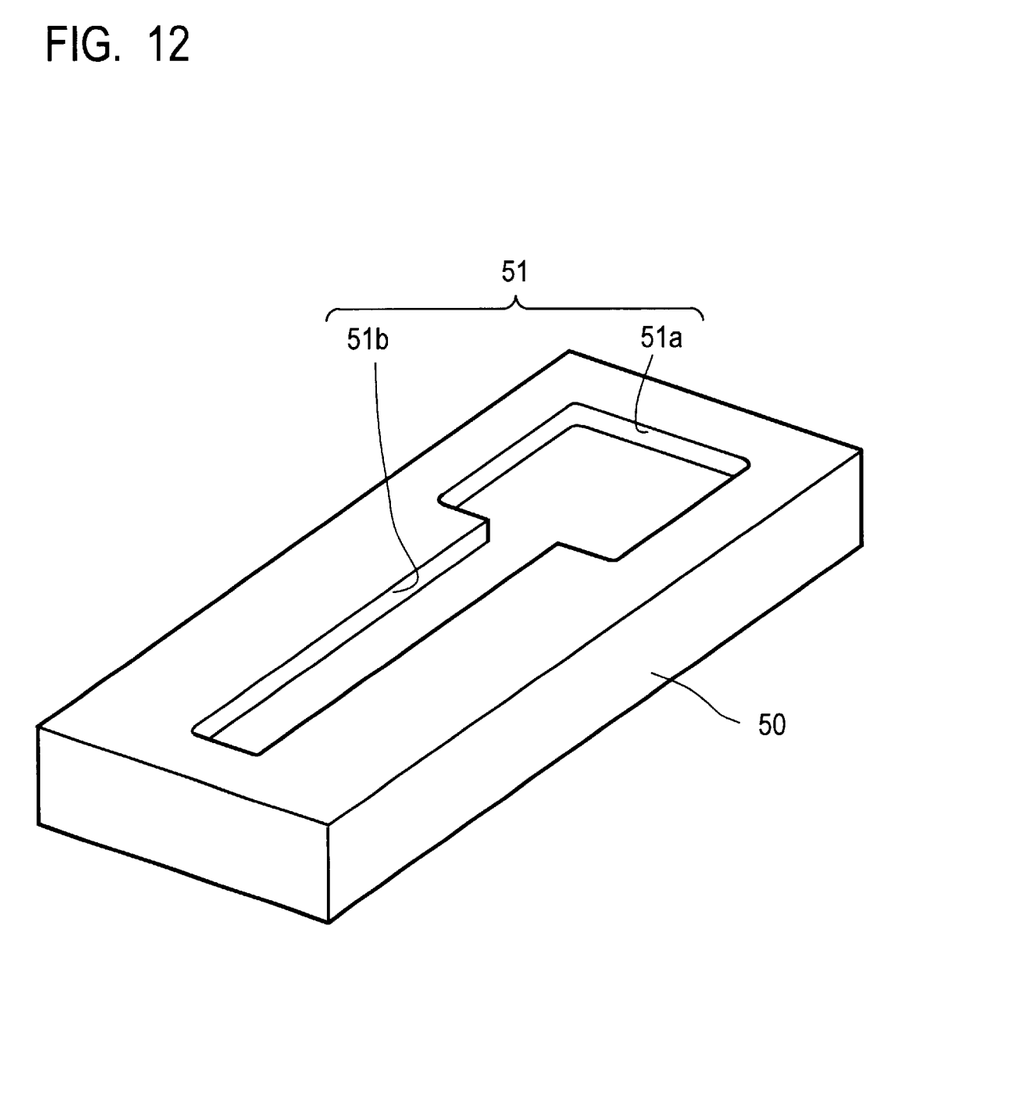
FIG. 12 is a perspective view of a positioning die for use in adhesive bonding of a strain sensor support portion 11 to an actuation panel 2.

The actuation panel 2 and the strain sensor support portion 11 are adhesive bonded in superposed relation with their shapes in registry. FIG. 12 shows a positioning or aligning die 50 which can be used to ensure accurate alignment between the actuation panel 2 and the strain sensor support portion 11. The die 50 has in its upper side a shallow concavity 51 which is identical in shape and in size with the pattern sheet 1. That is, the concavity 51 is composed of a depression 51a identical in size with the strain sensor support portion 11 and a depression 51b which communicates with the depression 51a and is identical in shape with the wire lead-out portion 12. In this case, however, the depression 51b is made longer than the wire lead-out portion 12.

The pattern sheet 1 is pressed in the concavity 51; namely, strain sensor support portion 11 is fitted in the depression 51a with the strain sensors 14 facing downward and the wire-lead-out potion 12 in the depression 51b. Thereafter, as described previously, a predetermined number of drops of adhesive are supplied onto the strain sensor support portion 11 from a dispenser, then the actuation panel 2 is put in the depression 51a and bonded to the strain sensor support portion 11. Then the pattern sheet 1 is removed from the die 50, taking up the free end of the wire lead-out portion 12 on the side of the depression 51b opposite the depression 51a.

Following this, the joystick 3 is attached to the actuation panel 2. On the upper side of the mounting plate 4 there are protrusively provided mounting studs or pins 46 corresponding to the positioning holes 19. The heights of the studs 46 are selected equal to the height H1. The stud 46 are shown to be punched upwardly from the mounting plate 4. The outer peripheral surfaces of the mounting studs 46 are equal to the shapes and sizes of the positioning holes 19.

The mounting studs 46 are fitted into the positioning holes 19 to align the actuation panel 2 with the mounting plate 2, followed by welding or adhesive bonding the actuation panel 2 to the projecting end faces of the studs 46. The positioning holes 19 and the mounting studs 46 may be arbitrarily shaped as long as they are aligned with each other.

In the bonding through the use of the aligning die 50, the pattern sheet 1 may be put in the concavity 51 after the actuation panel 2 is fitted in the depression 51a and then the adhesive is dropped thereon. The adhesive bonding of the actuation panel 2 and the strain sensor support portion 11 through utilization of the die 50 is also applicable to the first to fourth embodiments described above. In such an instance, the shape of the depression 51a is made the same as the shape of the actuation-deformable portion 21 of the actuation panel 2, octagonal in the afore-mentioned embodiments; the actuation panel 2 is turned upside down and fitted in the depression 51a with the fixing portions 22 facing upward, then the adhesive is dropped, and the strain sensor support portion 11 is fitted in the depression 51a for bonding to the actuation panel 2.

In the above, the actuation panel 2 needs only to be fixed to the mounting plate 4 at at least three positions. The point is to provide a structure which ensures accurate alignment between the strain sensor support portion 11 and the actuation-deformable portion of the actuation panel 2.

The strain sensor support portion 11 need not always be octagonal, nor does the actuation-deformable portion 21. Furthermore, the strain sensor support portion 11 and the actuation-deformable portion 21 need not be identical in shape.

As described above, according to the present invention, the strain sensor support portion 11 is attached to the actuation-deformable portion 21 in alignment therewith; the strain sensors 14 can be formed on the pattern sheet 1 with high accuracy through utilization of the wire printing technique; the pattern sheet 1 of desired geometries can be produced by press cutting with high precision; and the actuation panel 2 of desired geometries can also be obtained with high precision. Accordingly, when the strain sensor support portion 11 is once attached to the actuation-deformable portion 21, the fixing pieces 22 are spaced the same distance away from the joystick 3 and the strain sensors 14 are also spaced the same distance away from the joystick 3 and at equiangular intervals thereto. Accordingly, multi-way input devices of desired operation characteristics can easily be obtained.

When the mounting plate 4 is made of metal, the strain sensors 14 are surrounded by the mounting plate 4 and the actuation panel 2 of a resilient metal sheet, and hence they are less susceptible to external noise.

And, since the wire lead-out portion 12 and the strain sensor support portion 11 are formed as a one-piece structure of the pattern sheet 1, they are mechanically strong and insusceptible to damage during assembling, and this structure obviates the afore-mentioned defect of the prior art example of FIG. 1 such as scaling of the printed wires at the joint of the flexible cable 120 thereto.

Moreover, the manufacture of the multi-way input device according to the present invention involves only a step of forming the leads 15 and carrying out wiring for the strain sensors 14 on the synthetic resin film as of polyethylene terephthalate, and a step pf forming the strain sensors 14; unlike in the prior art, the flexible cable 120 need not be connected to the device. Hence, the input device of the present invention can be manufactured with more ease accordingly.

It will be apparent that many modifications and variations may be effected without departing from the scope of the novel concepts of the present invention.

What is claimed is:

1. A multi-way input device comprising:
   a pattern sheet made of a flexible synthetic resin film and forming, as a single-piece structure, a strain sensor support portion with a plurality of strain sensors formed on a first side of said strain sensor support portion and a wire lead-out portion having formed thereon leads connected to said strain sensors in a plane common therewith;
   an actuation panel made of a thin sheet of resilient metal and having an actuation-deformable portion and a plurality of fixing portions bent therefrom in the same direction, said strain sensor support portion being fixed on a second side of said strain sensor support portion opposite said strain sensors to the inside surface of said actuation-deformable portion;
   a joystick mounted protrusively on said actuation-deformable portion of said actuation panel at a position equidistant from said plurality of strain sensors; and
   a mounting plate having fixed thereto said actuation panel by said plurality of fixing portions with said actuation-deformable part spaced away from said strain sensor support portion.

2. The device of claim 1, wherein: said plurality of fixing portions are flat fixing pieces; said strain sensor support portion has positioning edges for making line contact with the flat faces of said plurality of fixing pieces; and said flat face of said fixing pieces and said positioning edges of said strain sensor support portion make line contact with each other to thereby align said strain sensor support portion with said actuation-deformable portion.

3. The device of claim 2, wherein said fixing pieces are spaced about the same distance away from said joystick.

4. The device of claim 3, wherein said actuation panel is square in shape and has said fixing pieces provided at its four corners, respectively.

5. The device of claim 2, wherein said actuation panel is made by press working of said thin sheet of resilient metal and said pattern sheet is made by press cutting from said flexible synthetic resin film.

6. The device of claim 2, wherein said strain sensors are resistance films whose resistance values change as they are distorted.

7. The device of claim 2, wherein said strain sensors are covered with a protective film.

8. The device of claim 2, wherein said mounting plate is made of metal.

9. The device of claim 8, wherein: said fixing pieces have their free end portions bent outwardly to form fixing parts; said mounting plate has a plurality of pawls upturned therefrom corresponding to said fixing pieces; and said pawls are bent onto the fixing parts of said corresponding fixing pieces to thereby fix said actuation panel to said mounting plate.

10. The device of claim 2, wherein said fixing pieces have their free end portions bent outwardly to form fixing parts, said fixing parts being adhesive bonded or welded to said mounting plate.

11. The device of claim 10, wherein said mounting plate has bumps formed integrally therewith in contact with the free ends of said fixing pieces and said actuation panel is positioned to said mounting plate by said bumps.

12. The device of claim 2, wherein said fixing pieces have their free end portions narrowed to form tabs, said tabs being press-fitted into fixing holes made in said mounting plate to thereby fixedly secure said actuation panel to said mounting plate.

13. The device of claim 1, wherein: said actuation panel is made by press working of said thin sheet of resilient metal; said plurality of fixing portions is tubular members extruded during said press working of said actuation panel, said fixing portions being spaced about the same distance away from said joystick; said pattern sheet is made by press cutting from said flexible synthetic resin film; said strain sensor supporting portion has a plurality of positioning holes for reception of said fixing portions, said positioning holes being made during said press cutting of said pattern sheet: and said fixing portions are inserted into said positioning holes to thereby align said strain sensor support portion with said actuation-deformable portion.

14. A multi-way input device comprising:

a pattern sheet press-cut from a flexible synthetic resin film and having, as a single-piece structure: a strain sensor support portion having formed on a first side of said strain sensor support portion a plurality of strain sensors at positions equiangularly spaced with respect to and equidistant from the center of said strain sensor support portion and a plurality of positioning holes made at positions equidistant from said center; and a wire lead-out portion having formed thereon leads connected to said strain sensors;

an actuator panel press-cut from a thin sheet of resilient metal into about the same shape of said strain sensor support portion and adhesive bonded in superposed relation to said strain sensor support portion on a second side of said strain sensor support portion opposite said strain sensors;

a joystick mounted protrusively on said actuation panel at said center of said strain sensor support portion on the opposite side thereto; and a mounting plate having formed integrally therewith a plurality of mounting studs of the same height for insertion in said positioning holes of said pattern sheet to position said actuation panel on said mounting plate with said plurality of strain sensors spaced away therefrom.

\* \* \* \* \*